United States Patent
Rasmussen et al.

(10) Patent No.: US 10,692,288 B1
(45) Date of Patent: Jun. 23, 2020

(54) COMPOSITING IMAGES FOR AUGMENTED REALITY

(71) Applicant: LUCASFILM ENTERTAINMENT COMPANY LTD., San Francisco, CA (US)

(72) Inventors: Nicholas Rasmussen, San Francisco, CA (US); Michael Koperwas, San Francisco, CA (US); Earle M. Alexander, IV, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 53 days.

(21) Appl. No.: 15/634,843

(22) Filed: Jun. 27, 2017

Related U.S. Application Data

(60) Provisional application No. 62/355,185, filed on Jun. 27, 2016.

(51) Int. Cl.
| | |
|---|---|
| *G06T 19/00* | (2011.01) |
| *G06T 15/60* | (2006.01) |
| *G06T 15/20* | (2011.01) |
| *G06T 15/04* | (2011.01) |
| *G06T 19/20* | (2011.01) |

(52) U.S. Cl.
CPC ............ *G06T 19/006* (2013.01); *G06T 15/04* (2013.01); *G06T 15/205* (2013.01); *G06T 15/60* (2013.01); *G06T 19/20* (2013.01)

(58) Field of Classification Search
CPC ..... G06T 19/006; G06T 19/20; G06T 15/205; G06T 15/60; G06T 15/04; G06T 19/00
See application file for complete search history.

(56) References Cited

U.S. PATENT DOCUMENTS

| | | | |
|---|---|---|---|
| 8,744,198 B1 * | 6/2014 | Kainz | G06T 9/005 382/166 |
| 9,734,634 B1 * | 8/2017 | Mott | G06T 19/006 |
| 9,947,134 B2 * | 4/2018 | Komenczi | H04N 13/271 |
| 2011/0057941 A1 * | 3/2011 | Dengler | G06T 15/20 345/545 |
| 2011/0181601 A1 * | 7/2011 | Mumbauer | G06F 3/011 345/473 |

(Continued)

*Primary Examiner* — Michael Le
(74) *Attorney, Agent, or Firm* — Kilpatrick Townsend & Stockton LLP

(57) ABSTRACT

A method may include capturing a first image of a physical environment using a mobile device. The mobile device may include a physical camera and a display. The method may also include receiving a second image from a content provider system. The second image may be generated by the content provider system by rendering a view from a virtual camera in a virtual environment. The virtual environment may represent at least a portion of the physical environment. A location of the virtual camera in the virtual environment may correspond to a location of the physical camera in the physical environment. The second image may include a view of a computer-generated object. The method may additionally include generating a third image by compositing the first image and the second image, and causing the third image to be displayed on the display of the mobile device.

17 Claims, 11 Drawing Sheets

(56) References Cited

U.S. PATENT DOCUMENTS

| | | | |
|---|---|---|---|
| 2012/0094754 A1* | 4/2012 | Suzuki | G06T 19/006 463/30 |
| 2012/0127284 A1* | 5/2012 | Bar-Zeev | G02B 27/017 348/53 |
| 2013/0147826 A1* | 6/2013 | Lamb | G09G 3/003 345/589 |
| 2013/0157239 A1* | 6/2013 | Russo | G09B 23/28 434/262 |
| 2013/0162639 A1* | 6/2013 | Muench | G06T 19/006 345/419 |
| 2014/0002582 A1* | 1/2014 | Bear | G06F 3/012 348/14.08 |
| 2015/0260474 A1* | 9/2015 | Rublowsky | F41A 33/00 434/16 |
| 2016/0104452 A1* | 4/2016 | Guan | G06T 19/006 345/633 |

* cited by examiner

COMPOSITING IMAGES FOR AUGMENTED REALITY

CROSS-REFERENCES TO RELATED APPLICATIONS

This application claims the benefit of U.S. Provisional Application No. 62/355,185 filed on Jun. 27, 2016, which is incorporated herein by reference.

FIELD

The present disclosure generally relates to compositing images for usage in augmented reality experiences.

BACKGROUND

Augmented reality includes a live view of a real-world environment that is augmented by computer generated sensory input(s), such as GPS graphics, video, sound, data statistics, and so forth. In contrast to virtual reality, which replaces the real-world environment with a simulated one, augmented reality elements are often displayed in real time in semantic context with elements of the real-world environment. For example, sports scores can be displayed on a television during a basketball game on a same screen. Head-mounted displays can also be used to place the virtual images over a view of the physical world such that both are in the user's field of view.

BRIEF SUMMARY

In some embodiments, a method may include capturing a first image of a physical environment using a mobile device. The mobile device may include a physical camera and a display. The method may also include receiving a second image from a content provider system. The second image may be generated by the content provider system by rendering a view from a virtual camera in a virtual environment. The virtual environment may represent at least a portion of the physical environment. A location of the virtual camera in the virtual environment may correspond to a location of the physical camera in the physical environment. The second image may include a view of a computer-generated object. The method may additionally include generating a third image by compositing the first image and the second image, and causing the third image to be displayed on the display of the mobile device.

In some embodiments, a mobile device may include a display, a physical camera, one or more processors, and one or more memory devices comprising instructions that, when executed by the one or more processors, cause the one or more processors to perform operations that may include capturing a first image of a physical environment using a mobile device. The mobile device may include a physical camera and a display. The operations may also include receiving a second image from a content provider system. The second image may be generated by the content provider system by rendering a view from a virtual camera in a virtual environment. The virtual environment may represent at least a portion of the physical environment. A location of the virtual camera in the virtual environment may correspond to a location of the physical camera in the physical environment. The second image may include a view of a computer-generated object. The operations may additionally include generating a third image by compositing the first image and the second image, and causing the third image to be displayed on the display of the mobile device.

In some embodiments, a non-transitory, computer-readable medium may include instructions that, when executed by one or more processors, cause the one or more processors to perform operations including capturing a first image of a physical environment using a mobile device. The mobile device may include a physical camera and a display. The operations may also include receiving a second image from a content provider system. The second image may be generated by the content provider system by rendering a view from a virtual camera in a virtual environment. The virtual environment may represent at least a portion of the physical environment. A location of the virtual camera in the virtual environment may correspond to a location of the physical camera in the physical environment. The second image may include a view of a computer-generated object. The operations may additionally include generating a third image by compositing the first image and the second image, and causing the third image to be displayed on the display of the mobile device.

In any of the embodiments described herein, any of the following features may be implemented in any combination and without limitation. The computer-generated object need not be present in the first image. The second image may include a four-channel image with an alpha channel. The alpha channel may indicate portions of the second image that should be at least semi-transparent such that corresponding portions of the first image are at least partially visible as background. The portions of the second image that should be at least semi-transparent may depict a shadow of the computer-generated object. The portions of the second image that should be at least semi-transparent may depict a mist or fog effect. The second image may include a cutout that at least partially obscures the view of the computer-generated object, where the cutout may correspond to an object in the physical environment. The computer-generated object may include a character that is driven by a motion-capture performance. The mobile device may include a light sensor that captures lighting information about the physical environment from a perspective of the physical camera, and the method/operations may further include transmitting the lighting information to the content provider system, where the virtual environment may be lighted based on the lighting information about the physical environment. The method/operations may further include transmitting a focal length of the physical camera to the content provider system, where a virtual focal length of the virtual camera may be adjusted to match the focal length of the physical camera. The method may further include a physical scanner that receives physical information about the physical environment, where the method/operations may further include transmitting the physical information to the content provider system, where objects in the virtual environment may be adjusted based on the physical information. The mobile device may further include visual fiducials, where a position of the visual fiducials may be determined by a plurality of cameras, where the location of the physical camera in the physical environment may be based on the determined location of the visible fiducials. The mobile device may further comprise an accelerometer that captures motion information for the mobile device, where the operations further include transmitting the motion information to the content provider system, and where the location of the virtual camera in the virtual environment may be adjusted based on the motion information. The third image may be displayed as part of a real-time video sequence on the display such that the third image is displayed within 50 ms of when the first image is captured by the physical camera. A time that the second image is generated in the virtual environment may correspond to a time when the first image is captured in the physical environment, such that when the third image is generated by compositing the first image and the second image, the first image and the second image may be synchronized. The third image may be larger than a display area of the display. The method/operations further comprise determining that a movement of the mobile device is less than a threshold amount, and causing the display to pan the third image rather than composite a new image based on the movement. The first image may include a first color palette, the second image may include a second color palette, and either the first image may be translated to the second color palette or the second image may be translated to the first color palette before the third image is generated. The second image may be compressed vertically when received by the mobile device such that a first half of the image comprises three-channel color information, and a second half comprises an alpha channel.

BRIEF DESCRIPTION OF THE DRAWINGS

Illustrative embodiments of the present invention are described in detail below with reference to the following drawing figure.

DETAILED DESCRIPTION

Figure 1:
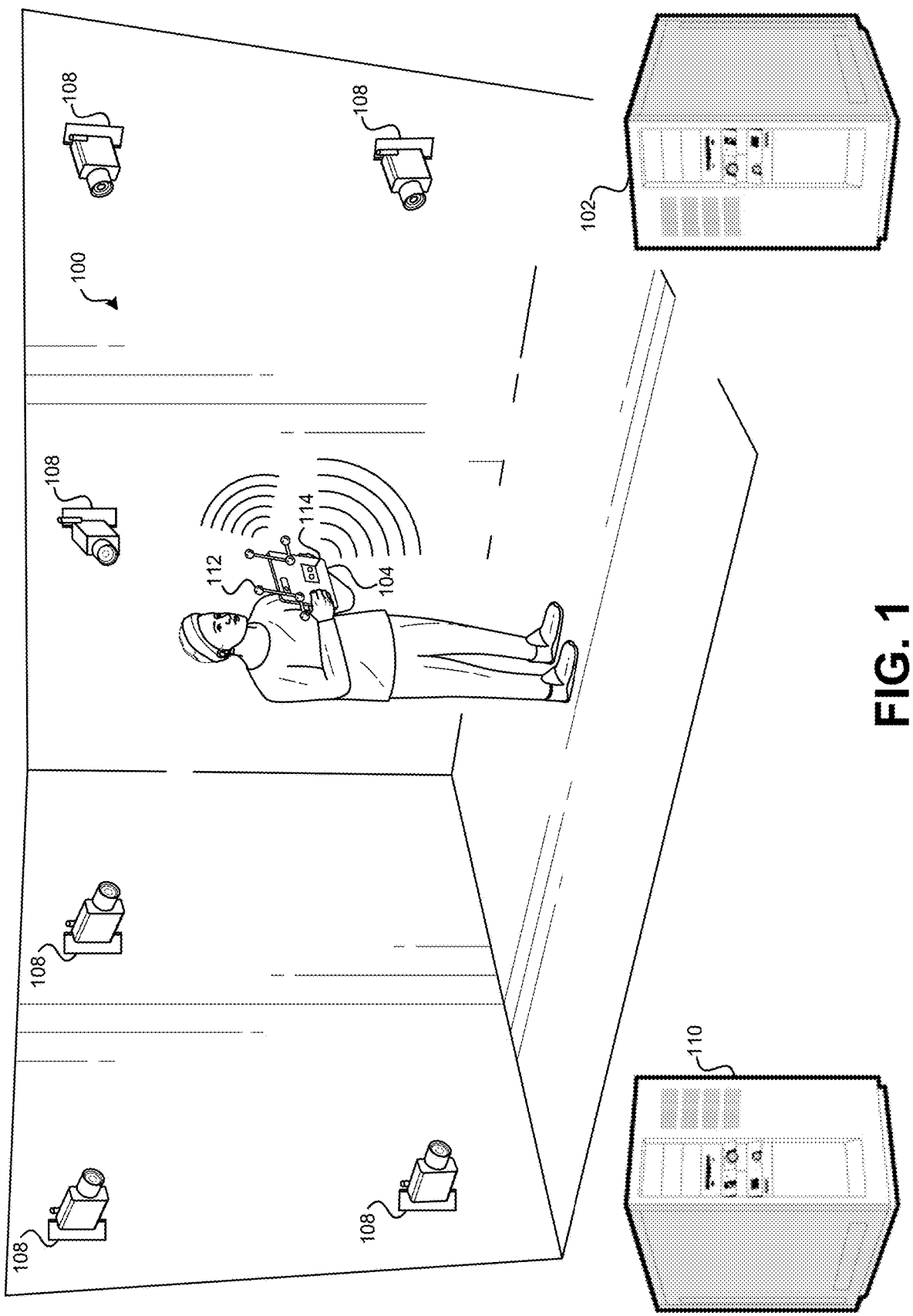
FIG. 1 illustrates an augmented/mixed reality system, according to some embodiments.

Described herein are embodiments for presenting augmented reality experiences using composited images. Specifically, the system allows for the compositing of images rendered remotely with images captured by the camera of a local mobile device (e.g., a tablet, virtual/augmented reality glasses/goggles, mobile phone, etc.). The composited image may then be presented to a user via a display of the local mobile device as part of an augmented or mixed reality experience.

In some embodiments, the system can determine the position of the mobile device in a physical environment. Some embodiments may also determine physical geometries of objects in the physical, interactive environment, along with lighting characteristics and lens characteristics of the mobile device itself. This information can be provided in real-time to a content provider system, such as a computer workstation or server that has more graphics processing power than the mobile device. The content provider system can insert computer-generated, digital content into a virtual, three-dimensional (3-D) environment that models the physical environment in which the mobile device is located. The position of a virtual camera in the virtual environment can be updated in real-time to reflect the position of the mobile device in the physical environment. Additionally, the digital content added to the virtual environment can be lighted and used to generate shadows to match the lighting characteristics of the physical environment. An image can then be rendered from the perspective of the virtual camera in the virtual environment, and pixels that do not depict the digital content added to the scene can be "keyed," or otherwise specified such that they can be composited correctly by the mobile device.

When the mobile device receives the rendered image from the content provider system, the mobile device can composite together the rendered image with a view of the physical world on the display device. The camera image from the mobile device can be used as a background image, and the rendered image from the content provider system can be used as a foreground image, effectively placing the digital content from the virtual environment in the view of the physical world displayed on a display of the mobile device. Background sections of the rendered image can be made transparent through an alpha channel or otherwise removed through keying techniques. Because the virtual environment includes digital models of the actual physical objects in the physical environment, the rendered image may include holdouts in the view of the digitally added content as it moves behind objects that appear in the physical environment. Effects such as smoke or fog can also be added to the composited image by the content provider system. To provide a realistic and real-time view of the augmented reality scene, the digital content can cast shadows on the view of the physical objects in the scene, and small movements made by the mobile device can cause the display to pan-and-scan instead of re-rendering the scene to provide a rapid visual response on the display.

FIG. 1 illustrates an augmented/mixed reality system 100, according to some embodiments. The system 100 may include a content provider system 102 and a mobile device 104. It should be appreciated that there may be additional components in the system 100 that are not specifically depicted in FIG. 1 for clarity. These additional system components may be described below.

The content provider system 102 may include one or more computers capable of receiving input indicating at least a position/orientation of the mobile device 104, generating one or more rendered images based at least in part on the input, and providing the generated one or more rendered images to the mobile device for compositing. In some embodiments, the rendered images may include tags or colors that indicate the manner in which the rendered images should be composited with images taken by a camera of the mobile device 104. In other embodiments, the rendered images may be provided with alpha images usable for compositing the rendered images with the images taken by the camera of the mobile device 104. For example, the content provider system 102 may include a Linux server running the Zeno™ software package, which provides a highly cached, multithreaded scene graph that allows the content provider system 102 to evaluate very complex scenes in real-time. In some embodiments, the content provider system 102 may comprise a plurality of servers and workstations that are networked together to distribute the processing of the virtual environment and render the images for compositing.

The mobile device 104 may be any suitable portable computing device, such as a tablet, a smartphone, a watch, a laptop, a pair of virtual-reality goggles, etc. In some embodiments, the mobile device 104 may include or be attached to a camera. The camera may face outward away from a user of the mobile device 104. The mobile device 104 may also include a display, such as one or more electronic screens that can be used to display the images captured by the camera on the mobile device 104 in real-time to a user. For example, the user may hold the mobile device 104 in front of them, and use the display of the mobile device 104 as a "window" through which to view the physical environment that surrounds them. As the user pans the mobile device 104 around the physical environment, the display can depict a view of the environment as would be seen by the user if the mobile device 104 were not present. In many cases, the view of the physical environment should appear unchanged in terms of color, scale, and lighting when the mobile device 104 is removed from the user's field of view.

The mobile device 104 may also include one or more sensors that can determine an orientation and/or location of the mobile device. For example, the mobile device 104 may include a digital compass, tilt sensors, a GPS receiver, a radio-frequency identification RFID tag or transmitter, and/or a three-axis accelerometer. The one or more sensors can be calibrated to precisely determine the position and/or orientation of the mobile device 104 as it is moved throughout the physical environment. Additionally, as the user tilts or rotates the mobile device 104, the one or more sensors can determine and update the orientation of the mobile device 104 (i.e., the direction that the mobile device is pointed). The position and/or orientation of the mobile device 104 can be used to move and/or orient the virtual camera in the virtual environment to correspond to the location and/or orientation of the camera of the mobile device 104 in the physical environment.

In some embodiments, but the content provider system 102 and the mobile device 104 may include wireless communication systems that allow the mobile device 104 and the content provider system 102 to communicate with each other in real-time over a network. The network may include the Internet, a cloud network, a wide-area network (WAN), a local-area network (LAN), an intranet, a mobile hotspot, a Bluetooth® or ZigBee® network, and so forth. In some embodiments not shown in FIG. 1, the content provider system 102 and the mobile device 104 may also communicate via a wired connection.

In some embodiments, the system 100 may also include additional components. These additional components may be integrated with the content provider system 102 and/or the mobile device 104, or these additional components may be otherwise distributed in different locations around the physical environment. Some embodiments may include a motion capture (mo-cap) system for determining the location and/or orientation of the mobile device 104 along with other physical objects in the physical environment. The motion capture system may include a plurality of cameras 108 distributed throughout the physical environment. The plurality of cameras 108 can record views of the physical environment from different perspectives, and these different views can be analyzed by a motion capture computer system 110 to visually determine the location/orientation of one or more visual fiducials 112 in the physical environment. The visual fiducials 112 may include any sort of marker or object, and may be coated with a retroreflective material. In the example of FIG. 1, the visual fiducials 112 may be physically mounted to the mobile device 104.

In some embodiments, the system may also include one or more light sensors. In some embodiments, the light sensor(s) can be mounted to or integrated in the mobile device 104. This allows for the light sensors to provide a position and intensity of light sources as would be seen by the mobile device 104. In some embodiments, the light sensor may include a 360° camera system, such as the OZO™ system from Nokia®. A 360° camera can provide real-time video stream that can be used to stream a panoramic video texture to the content provider system 102. The video stream can then have the lighting sources extracted from the real-time video and placed or modeled in the virtual environment. Alternatively or additionally, the one or more light sensors may be positioned on or near the user, rather than on or near the mobile device 104. In these cases, the one or more light sensors may provide lighting locations as would be seen by the user rather than by the mobile device 104. Some embodiments may also include sensors that determine when lighting systems are activated. For example, the system 100 may include sensors that determine when a light switch is flipped, when a light-emitting appliance is turned on, and so forth.

In some embodiments, the system 100 may also include a physical scanner 114 to ascertain a geometry and/or position of physical objects near the mobile device 104 in the physical environment. For example, the physical scanner 114 may include a Kinect® device, or any other line-of-motion-sensing input device. The physical scanner 114 can, in some embodiments, be mounted to the user and/or the mobile device 104. The physical scanner 114 can devices that include infrared (IR) emitters and depth cameras that analyze IR patterns to build 3-D map of physical objects in the physical environment. In some embodiments, the depth cameras may be integrated as part of the mobile device 104. Some embodiments may augment and/or replace the physical scanner 114 with various other sensors throughout the physical environment to ascertain the location of physical objects. For example, a chair in the physical environment may include accelerometers and/or other motion sensors to determine when the chair is moved or rotated. This information can be transmitted to the content provider system 102 such that a virtual model of the chair in the virtual environment can be moved/rotated to reflect the movement of the chair in the physical environment. By determining the position and geometry of physical objects in the physical environment, the computer-generated content in the virtual environment can interact with corresponding virtual models of the physical objects in a realistic way.

Some embodiments may use additional systems for determining the location/orientation of the mobile device and/or other objects in the physical environment. For example, some embodiments may use a virtual-reality system to locate these objects, such as the VIVE Lighthouse® and controller. Other embodiments may use RFID tags and/or transmitters to triangulate the location of the mobile device 104 and/or other objects in the physical environment.

Figure 2:
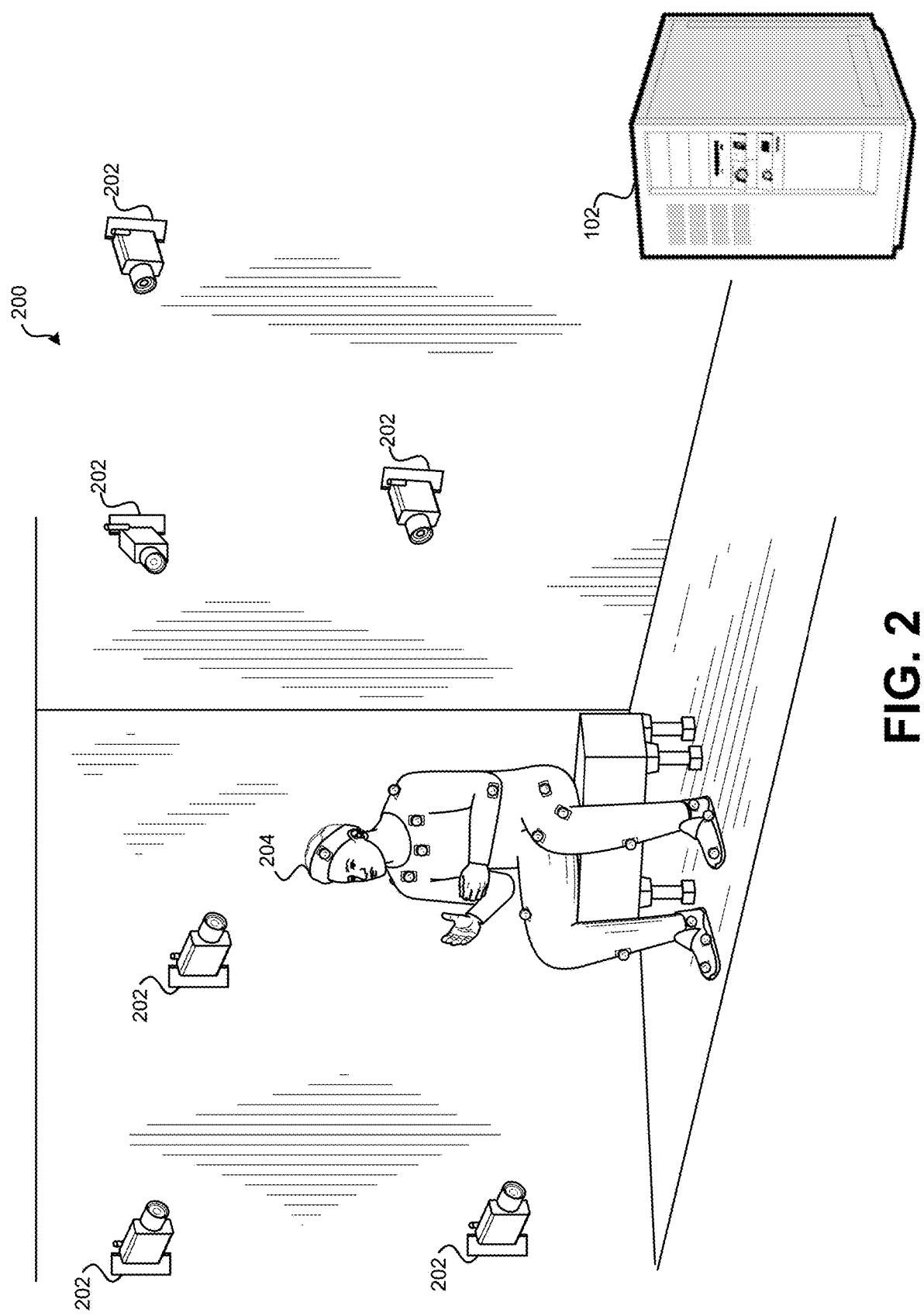
FIG. 2 illustrates a system that can be used to drive digital content in a virtual environment, according to some embodiments.

FIG. 2 illustrates a system 200 that can be used to drive digital content in a virtual environment, according to some embodiments. In order to provide an interactive experience for an augmented reality user, the computer-generated content that is added to the video stream captured by the camera of the mobile device can be driven by human actors in a motion capture environment. The system 200 may include a plurality of cameras 202 and a motion capture actor 204. Just as the mobile device 104 depicted in FIG. 1 may use visual fiducials to locate the mobile device 104 in the physical environment, the motion capture actor 204 can also wear a suit that includes visual fiducials 206 such that the plurality of cameras 202 can determine the location of the motion capture actor 204. The motion of the motion capture actor 204 can be used to drive a digital character in the virtual environment. A specific example of a motion capture actor driving an animated character will be described in greater detail below.

In other embodiments, computer-generated objects in the virtual scene can additionally or alternatively be driven by automated processes. For example, some embodiments may use a game engine to drive the computer-generated content added to the virtual environment. In some embodiments, the Unreal Engine® may be used to drive the animation and physical responses of computer-generated characters. Inputs can be provided from the user and/or mobile device 104 and provided to the game engine to generate reactions in the computer-generated character. For example, the user may hold out a hand in the physical environment, and the game engine may cause the computer-generated character to shake the user's hand in the virtual environment. In other examples, the game engine may generate reactions in the animated character based on user movements or actions.

In some embodiments, predetermined animation sequences can be stored on the content provider system 102. Each predetermined animation sequence can be responsive to certain user inputs, including the motion/orientation of the user in the physical environment. For example, a user could move from a first location to a second location in the physical environment. As the new location/orientation of the mobile device is provided to the content provider system 102, the animated character can follow the user in the virtual environment such that the animated character appears to walk with the user in the augmented reality experience of the physical environment as viewed through the mobile device 104.

To illustrate how the process of compositing computer-generated content onto images captured by the mobile device proceeds, a particular example of a mobile device, physical environment, and computer-generated object will be described below. However, it will be understood that these figures and descriptions are merely exemplary and not meant to be limiting. Many other types of physical environments, computer-generated objects, and mobile devices may be used by various embodiments. Specifically, the physical and/or virtual environments may be much larger or smaller than the those depicted. Non-humanoid computer-generated characters or objects may also be used. Different types of mobile devices described above may be used in place of the tablet computer depicted below. Additionally, many elements of the system 100 depicted in FIG. 1 and/or the system 200 depicted in FIG. 2 (e.g., motion capture cameras) have been omitted for clarity, but it will be understood that such elements may be included in any of the figures below.

Figure 3:
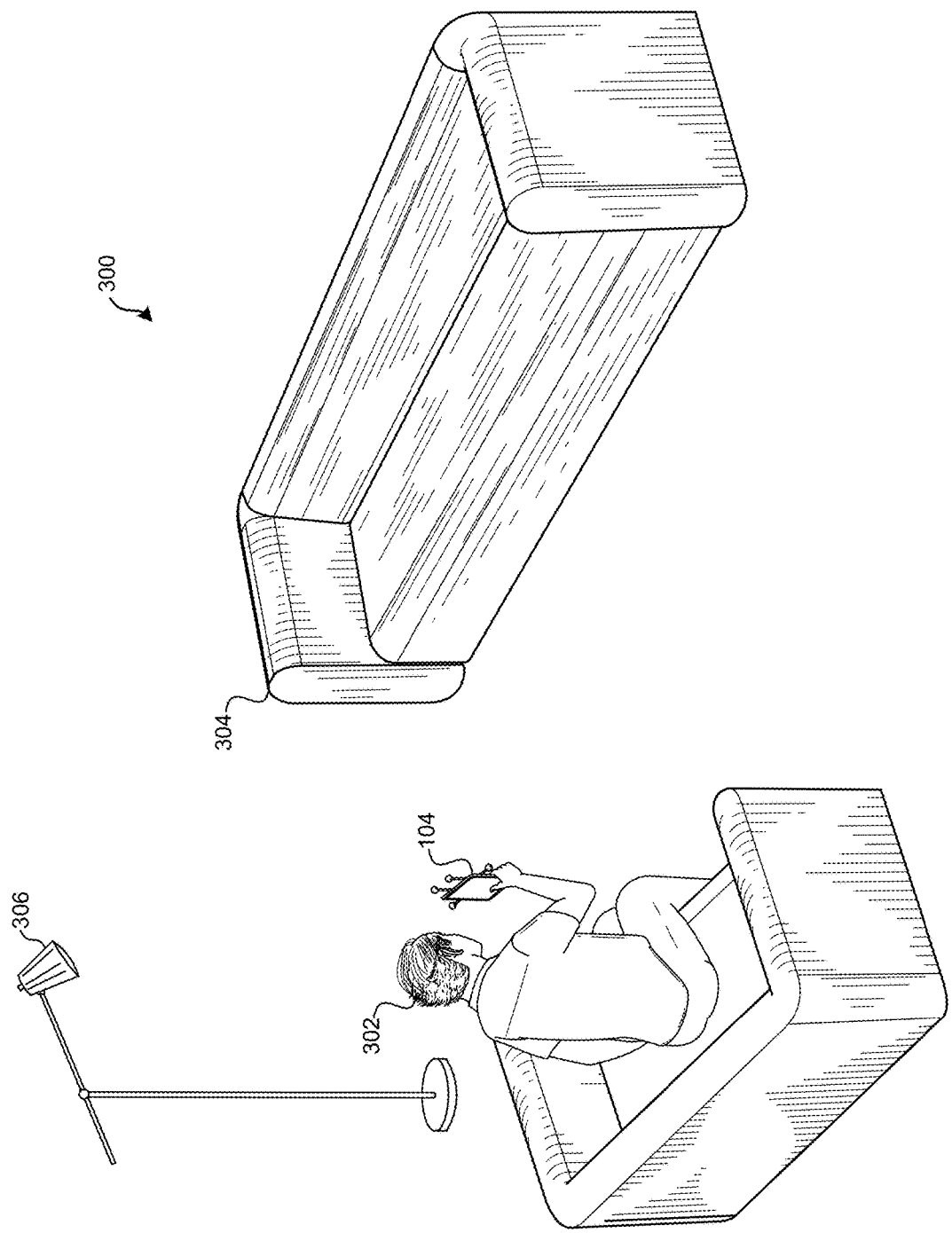
FIG. 3 illustrates an example physical environment were the mobile device can provide an augmented reality experience, according to some embodiments.

FIG. 3 illustrates an example physical environment 300 were the mobile device 104 can provide an augmented reality experience, according to some embodiments. The user 302 can hold the mobile device 104 such that the user 302 is able to view a portion of the physical environment through the mobile device 104. Specifically, the camera of the mobile device 104 can capture an image that is displayed in real time on the display of the mobile device 104. In this example, the user 302 sits on a chair and views a physical object 304 (e.g., the couch) through the mobile device 104. The physical environment 300 may also include a light source 306 that projects light into the field of view of the mobile device 104.

To begin generating the augmented reality experience, certain information regarding the physical environment 300 may be transmitted to the content provider system described above. Specifically, the content provider system may receive a location and/or orientation of the mobile device 104 in relation to the physical environment 300. The location and/or orientation of the mobile device 104 may be transmitted from the mobile device 104 to the content provider system through a wireless and/or wired connection. The location and/or orientation of the mobile device 104 may be determined by one or more sensors that are integrated as part of the mobile device 104, including accelerometers, GPS receivers, digital compasses, tilt sensors, and so forth.

In some embodiments, the location and/or orientation of the mobile device 104 need not be transmitted or determined by the mobile device 104 itself. Instead, the location and/or orientation of the mobile device 104 may be determined by other systems. For example, a motion capture system may visually determine the location and/or orientation of the mobile device 104 using visual fiducials that are attached to the mobile device 104. The motion capture system may then transmit the location and/or orientation of the mobile device 104 to the content provider system via a wired or wireless connection. In some embodiments, a plurality of RFID stations distributed around the physical environment can transmit/receive signals from an RFID tag on/in the mobile device 104. The RFID stations can then transmit signal information to the content provider system, where a location and/or orientation of the mobile device 104 can be determined. Multiple RFID tags on the mobile device 104 may be used to determine orientation. In some embodiments, a virtual-reality system can locate a Lighthouse device on the mobile device 104, and transmit the location and/or orientation of the mobile device 104 to the content provider system.

In addition to the location and/or orientation of the mobile device 104, other information regarding the physical environment may also be provided to the content provider system. In some embodiments, lens information for the camera of the mobile device 104 may be provided to the content provider system. This information may be transmitted from the mobile device 104 to the content provider system as part of a calibration or startup routine. Alternatively, this information may be stored on the content provider system if the lens information from the mobile device 104 is known. Lens information may include a focal length, an f-stop, and/or physical characteristics of the lens of the camera itself, included lens distortion properties. Note that the focal length (and thus the f-stop) of the camera may change dynamically as the user moves through the physical environment 300 and zooms in/out or focuses on different aspects of the physical environment 300. Therefore, the focal length and other lens information may be updated in real-time as changes occur in the physical environment 300 such that they can be duplicated by the virtual camera in the virtual environment.

In some embodiments, lighting information may also be provided to the content provider system. Lighting information may be obtained from one or more light sensors including light-sensitive devices, such as photoreceptor sensors or video cameras. The one or more light sensors may be located throughout the physical environment 300 and/or may be mounted directly to the user 302 and/or the mobile device 104. In some embodiments, raw sensor data or images may be transmitted to the content provider system, and the content provider system can then extract lighting information from the raw sensor data. For example, the position of light sources (e.g., light poles, windows, appliance screens, etc.) may be known and previously positioned in the virtual environment. The sensor data retrieved from the one or more sensors in the physical environment 300 can be used to determine an intensity of the light emitted by the known light sources. In another example, the one or more sensors may also be used to locate the position and/or orientation of light sources in the physical environment 300. For example, images taken from multiple video cameras can be used to determine a location of a light source in the physical environment 300. In some embodiments, additional sensors may be used, such as electrical sensors that detect when light sources have been activated in the physical environment. For example, a switch sensor may determine when a light switch has been flipped in the physical environment, which may correspond to an activation of a light source in the virtual environment.

In addition to the lens information, color information may also be provided to the content provider system. For example, a color palette used by the hardware/software of the mobile device 104 to capture the image of the physical environment 300 that is displayed to a user may be provided to the content provider system. This may be needed in cases where the color palette of the mobile device 104 is different from the color palette of the content provider system. This allows the content provider system to render and provide an image of the virtual scene with the added computer-generated object using a color palette that is compatible with the display of the mobile device 104.

In some embodiments, position information and physical geometries in the physical environment 300 may also be provided to the content provider system. For example, computer-generated objects may need to interact with the physical object 304 in the physical environment 300 (e.g., a digital character may need to sit on the couch, or at least avoid the couch when moving around the virtual environment 300). As described above, the mobile device 104 may include a physical scanner that measures distances of objects from the mobile device 104. This may be used to estimate the geometries and positions of physical objects in the physical environment that surrounds the mobile device 104. In some embodiments, the depth measurements from the physical scanner can be used to construct a 3-D model of the physical environment 300. In other words, as the mobile device 104 is moved around the physical environment 300, geometries of physical objects in the field of view of the mobile device 104 can be gradually constructed. These geometries can persist in the 3-D model even when they leave the view of the physical scanner of the mobile device 104. Some embodiments may transmit 3-D models and/or geometries to the content provider system, while other embodiments may transmit raw sensor data, such as a depth image representing the physical environment as a grayscale image recorded by the physical scanner. Note that the range of many physical scanners may be limited to a few meters. Therefore, the physical geometry/position information provided to the content provider system from a physical scanner may be thresholded, such that geometries farther than a predetermined distance from the scanner device need not be considered by the content provider system.

Some embodiments may also provide sensor outputs to the content provider system that indicate positions and/or movements of physical objects in the physical environment 300. For example, a chair may include a rotation sensor in the physical environment 300 that determines when a chair has been rotated. The same chair may also include accelerometers that indicate when the chair has been moved. Outputs from the sensors can be provided to the content provider system such that a model of the chair in the virtual environment can rotate/move with the physical chair in the physical environment 300 in real time.

In addition to the environmental information (e.g., light, geometries, motion, orientation, etc.) provided to the content provider system, additional user inputs can also be provided to the content provider system. For example, the mobile device 104 may include a touchscreen display that allows the user 302 to provide inputs that select different types of computer-generated objects and/or content that may be added to the augmented reality experience. In addition to selecting objects to be included in the experience, the user may also provide inputs that interact with the computer-generated objects. For example, a user may provide an input that indicates a physical interaction with a digital character, such as punching or pushing the digital character. A user may also target a digital character using a targeting reticle on the display of the mobile device 104 and provide an input that causes a virtual weapon to be fired at the character. When receiving these inputs, the content provider system can use predetermined animation sequences and/or an automated game engine response to cause the computer-generated object to react in a realistic way to the user inputs, such as falling over or acting hurt.

Figure 4:
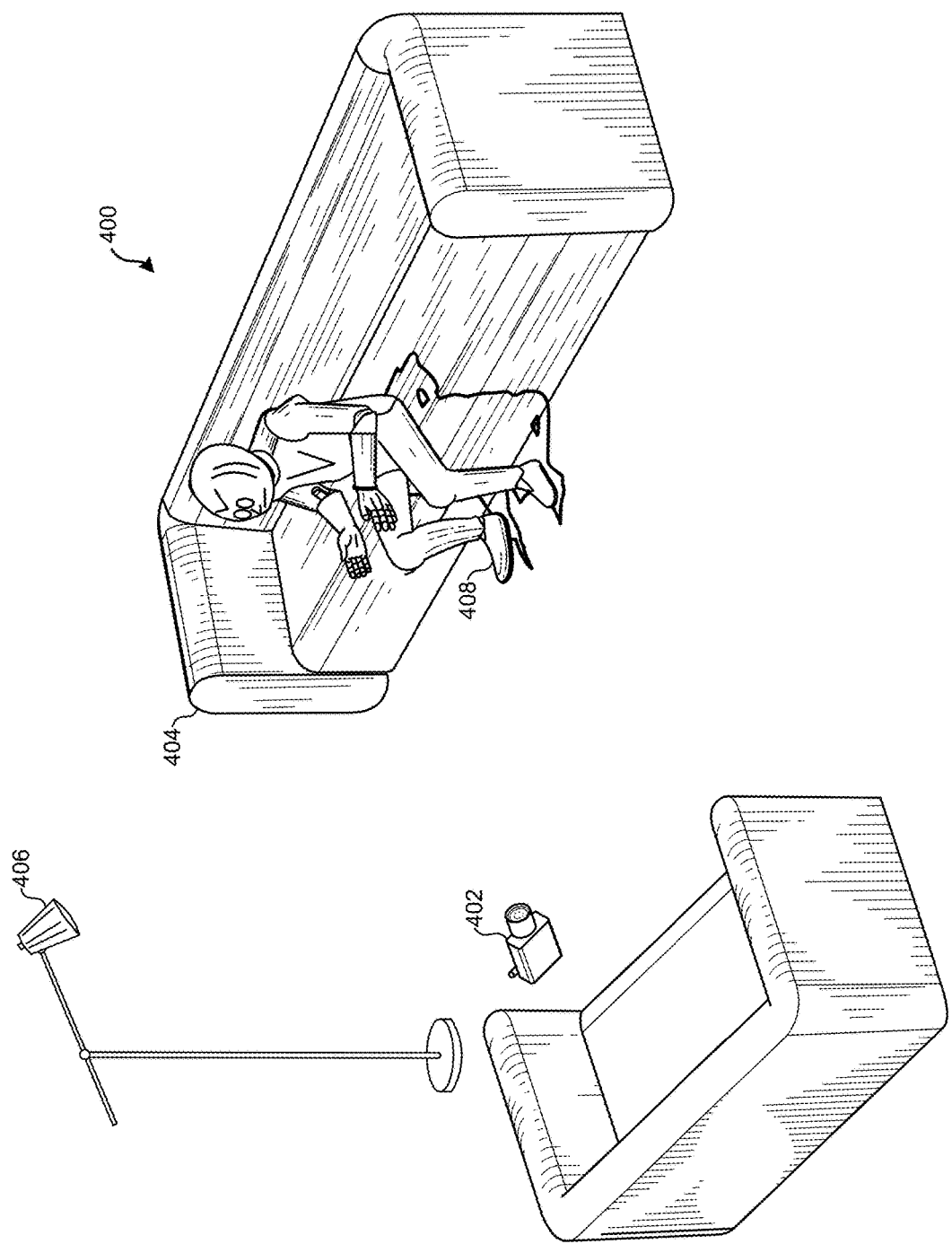
FIG. 4 illustrates a virtual environment through which computer-generated objects can be added to the augmented reality experience, according to some embodiments.

FIG. 4 illustrates a virtual environment through which computer-generated objects can be added to the augmented reality experience, according to some embodiments. The virtual environment may reside on the content provider system, and may comprise a 3-D representation of the physical environment depicted in FIG. 3. The virtual environment may include virtual representations of any of the physical objects in the physical environment 300. These virtual representations may include models or geometries of objects that are obtained/altered in real-time based on the physical scanners and/or sensor inputs described above. This allows a user to gradually build an accurate virtual representation of any physical environment by visually scanning the room with the mobile device 104 and allowing the physical scanners to build a geometry of the surrounding space. Thus, some embodiments may require no additional information about the physical environment other than the physical geometries that are scanned by the mobile device 104. This allows users to take the mobile device 104 to any physical environment, and within a few seconds of walking around the physical environment, build an accurate virtual environment in the content provider system that mirrors the physical environment. In order to provide a realistic and accurate augmented reality experience, the virtual environment may be configured to duplicate the physical environment as closely as possible, and to do so in real time such that changes to the physical environment are immediately reflected by similar changes in the virtual environment.

In some embodiments, rather than scanning the physical environment, the virtual environment may be built beforehand using digital models of the physical environments. These physical models can be designed by model designers in a computer animation pipeline. Alternatively or additionally, these models can be retrieved from commercial sources or websites that provide digital models for common objects. For example, architectural models may be provided for buildings, furniture, or landscaping. These digital models can be downloaded and included in the virtual environment such that they are positioned and oriented to match the physical environment. In FIG. 4, a model of a physical object 404 is included in the virtual environment. This model of the physical object 404 corresponds to the physical object 304 in FIG. 3 (e.g., the couch). Some embodiments may also mix predetermined models of physical objects with light sensor data from the physical environment. For example, the model of the physical object 404 may be initially loaded and placed in the virtual environment to correspond to its location in the physical environment. However, during the augmented reality experience, the user may move the physical object 304. This would normally create an inconsistency between the physical environment and the virtual environment. Using the sensor inputs (e.g., the physical scanner, movement sensors, accelerometers, etc.) the location of the model of the physical object 404 in the virtual environment 400 can be moved in real-time to correspond to the movement of the physical object 304 in the physical environment 300. This combination of pre-existing digital models and live sensor inputs can provide very realistic and detailed models of physical objects in the virtual environment 400, while still providing real-time position and movement correspondence between the virtual environment 400 and the physical environment 300.

In some embodiments, the virtual environment 400 may include a virtual light source 406 that corresponds to a physical light source 306 in the physical environment 300. As with other models of physical objects in the virtual environment 400, the position and/or orientation of the virtual light source 406 can be moved/rotated based on the one or more sensor inputs from the physical environment 300. For example, when a user flips a light switch in the physical environment 300 to turn on the physical light source 306, the virtual light source 406 in the virtual environment 400 can also be activated to match the measured or predetermined luminosity of the physical light source 306. By duplicating the lighting of the physical environment 300 in the virtual environment 400, computer-generated objects that are inserted into the composited images may have a more lifelike appearance. Instead of being lighted differently or appearing out of place, the computer-generated objects will instead appear to fit in naturally with the rest of the physical environment 300.

To augment the experience of the user 302, the content provider system can insert computer-generated objects into the virtual environment. In this manner, the user can experience new environmental effects, scenery, props, characters, and so forth, that may not exist in the physical environment 300. In order to display the computer-generated objects on the screen of the mobile device 104, these objects can first be inserted into the virtual environment 400, then rendered from the perspective of a virtual camera 402 that matches the perspective of the mobile device 104.

In the example of FIG. 4, a computer-generated object 408 representing a computer-generated image (CGI) of a humanoid character (e.g., a generic robot character) has been inserted into the virtual environment 400. Note that the computer-generated object 408 does not exist in the physical environment 300, and thus is only visible to the user 302 through the mobile device 104 during the augmented reality experience. Some computer-generated objects may be stationary, such as a scenery element, including spaceships, control panels, doors, screens, and so forth. Some computer-generated objects may have motion that is controlled by an automated process. For example, effects may be added to the virtual environment, such as steam, fog, smoke, mist, and so forth. The motion of these environmental effects may be automated such that the mists/smoke flows or oscillates through the scene. Some computer-generated objects may be controlled by a game engine or a predetermined sequence of animated motions. For example, a CGI character can walk, talk, and perform other actions that have been precomputed as part of a scene. Additionally, a CGI character may be responsive to user inputs (e.g., user dialog, user actions, user movement) and respond accordingly based on a plurality of parallel scripts that may be executed, or based on outputs from a physics engine and/or game engine.

In some embodiments, the computer-generated object 408 can be driven by a motion capture actor as depicted in FIG. 2. The motion capture actor may be presented with a screen depicting the actions, dialogue, and movements of the user 302 in the physical environment 300. Thus, the motion capture actor can respond to the user 302 in real time. By viewing the physical environment 300 through the mobile device 104, the user 302 in the physical environment 300 can interact with the computer-generated object 408 in real time as the computer-generated object is driven by the motion capture actor. In some embodiments, the motion capture actor may be located in the same room as the user 302 and the physical environment 300. Therefore, the motion capture actor may be able to watch and respond to the user 302 in a live fashion. In other embodiments, the motion capture actor can be in a completely separate building or facility, and the view of the user 302 can be transmitted and displayed in real time to the motion capture actor during his/her performance.

In some embodiments, both the user 302 and the motion capture actor may be participating as motion capture actors. In other words, both participants may use a mobile device to view the other participant. The motion capture system in each physical environment can be used to determine the motions of the actor/user, as well as to determine the position of the mobile devices. Both participants would see the other participant as represented by the computer-generated character rather than their live version in the corresponding physical environment. For example, both participants could contact each other through their mobile devices and appear to talk to each other in the same room from their own perspective. The first user would view the second user standing in the first user's room, while the second user would view the first user standing in the second user's room. Additionally, to each other, both users could appear as different characters (e.g., two CGI droid characters) during the augmented reality experience.

To capture the view of the virtual environment 400 in a way that matches the view of the user 302 in the physical environment 300, a virtual camera 402 can be positioned and oriented in the virtual environment 400 in a location that corresponds to the location of the user 302. As the user 302 moves the mobile device 104 in the physical environment 300, the virtual camera 402 can follow that movement in the virtual environment 400. For example, if the user 302 turns to their right and walks forward 2 m in the physical environment 300, then the virtual camera can similarly turn to its right and move forward 2 m in the virtual environment 400. The content provider system can use the provided orientation/position information of the mobile device 104 to drive the movements and rotations of the virtual camera 402. For example, the accelerometer inputs from the mobile device may be provided in real-time to the content provider system, which can make corresponding movements with the virtual camera 402.

In addition to matching the orientation and/or position of the physical camera, the virtual camera 402 can also match the lens characteristics of the virtual camera. Some rendering operations may receive a lens distortion function that can be applied to the rendered image. Additionally, the focal length of the physical camera can be received by the content provider system, and the focal length of the virtual camera can be adjusted to match. As described above, when the color palette of the mobile device 104 is different from the color palette of the content provider system, the image rendered by the content provider system can translate its color palette to match that of the mobile device 104. Additional lens distortion functions can also be applied such that the image transmitted from the content provider system to the mobile device 104 for compositing looks substantially like an image captured by the physical camera of the mobile device 104.

Because the compositing of computer-generated objects on the mobile device 104 takes place in real-time, the virtual environment may need to be updated in real-time as well. The update intervals may correspond to a frame rate of the mobile device 104 (e.g., 30 frames per second), such that the virtual environment is updated to correspond to each frame captured by the camera of the mobile device 104. As used herein, the term "real-time" may include real-time or near real-time computing such that results are displayed to the user at interactive frame rates. In some embodiments, "real-time" may include displaying a composite image on the screen of the mobile device within 5 ms, 10 ms, 20 ms, 30 ms, 50 ms, or 100 ms of a time at which the corresponding image was captured by the camera of the mobile device.

In some embodiments, many aspects of the physical environment 300 may not change between frames captured by the camera of the mobile device 104 and/or the virtual camera 402. Therefore, some embodiments may determine at each frame whether an update is required before going through the processing steps needed to update the virtual environment 400. Some embodiments may require physical changes in the physical environment 300 to exceed a predetermined threshold (e.g., an object must move more than 1%, or more than 1 cm). Some embodiments may instead send updates at regular intervals, such as every 5 ms, 10 ms, 20 ms, 30 ms, 50 ms, or 100 ms.

Figure 5:
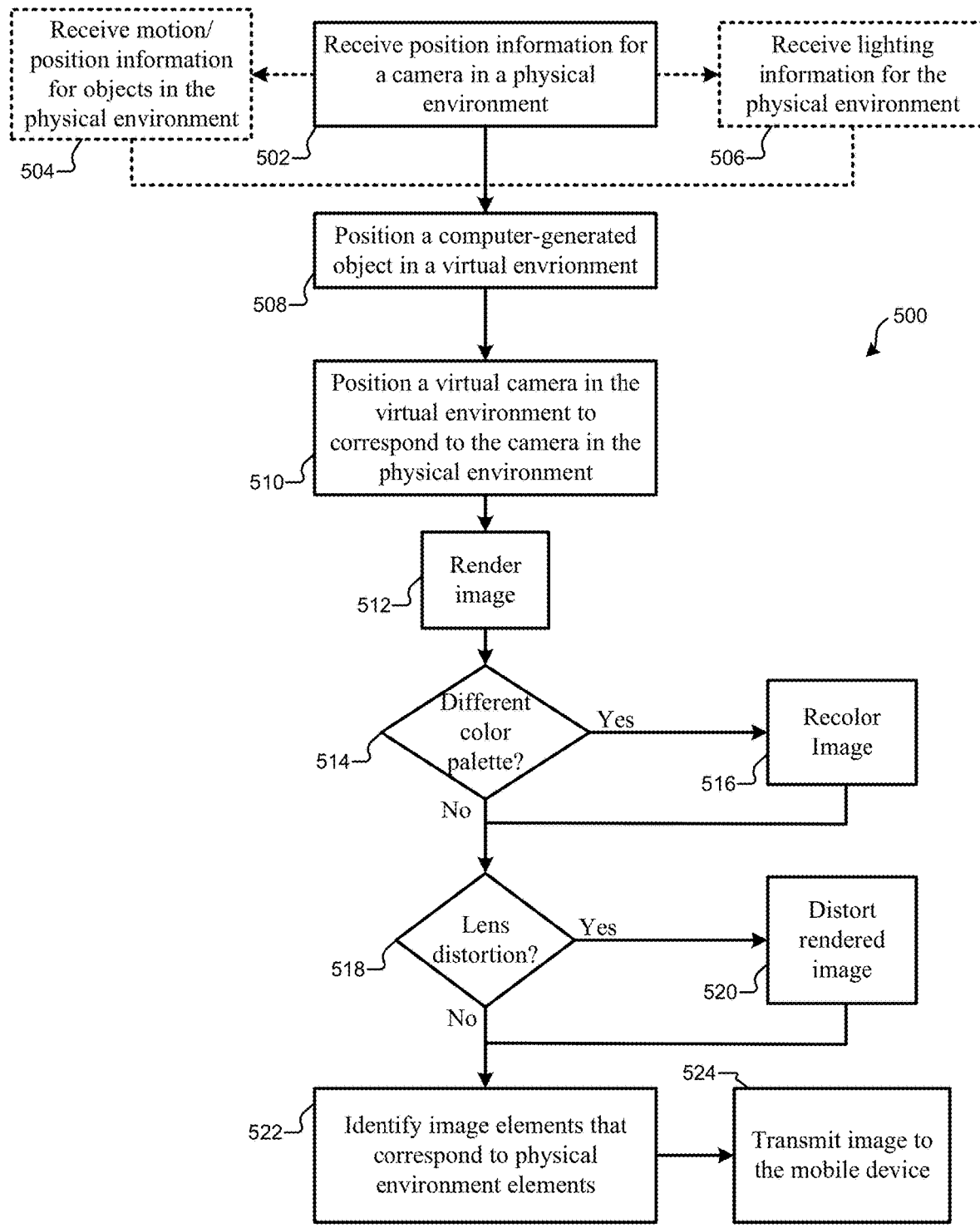
FIG. 5 illustrates a flowchart of a method for generating a rendered image to be composited on a mobile device, according to some embodiments.

FIG. 5 illustrates a flowchart 500 of a method for generating a rendered image to be composited on a mobile device, according to some embodiments. The method may include receiving position information for a camera in a physical environment (502). The position information may be received from the mobile device itself, or from a variety of sensors found in the physical environment as described above. The position information may be received by a content provider system that is separate from the mobile device. Optionally, the method may include receiving motion or position information for objects in the physical environment (504), as well as receiving lighting information for the physical environment (506) as described above.

Prior to receiving the aforementioned information for the mobile device, the content provider system may load a file including data usable for generating content (e.g., images, video, audio) for an augmented reality experience. In particular, the file may include information regarding a 3-D virtual environment. The 3-D virtual environment information may include information regarding virtual backgrounds, characters, objects, and/or other virtual assets. For example, the information could specify an object's position in the virtual environment and the object's shape, texture, color, etc. In one aspect, the file may also include timing information for the 3D virtual environment (e.g., timeline information for when certain objects or interactions should occur as a user views an item of content, etc.).

The method may also include positioning a computer-generated object in a virtual environment (508). The virtual environment may be a 3-D representation of the physical environment, including scenery, props, furniture, lighting sources, sound sources, and so forth. The virtual environment may be modeled on the content provider system, and may include a wide variety of additional CGI characters, effects, and other objects that can be inserted into the virtual environment that are not found in the physical environment. Using the information received above, the method may also include positioning a virtual camera in the virtual environment to correspond to the camera in the physical environment (510). The virtual camera of can be located and/or oriented to match the location and/or orientation of the physical camera in the corresponding physical environment such that an image captured by the physical camera will approximately match an image captured by the virtual camera. In some embodiments, the content provider system may generate an image based on the information from the mobile device, sensors, motion capture system, etc., and the information regarding the virtual environment of the loaded file. For example, the content provider system may automatically map an initial location and orientation of the mobile device 104 to an initial virtual location and orientation of the virtual camera 402 associated in the virtual environment 400.

The method may further include rendering an image of the virtual scene from the perspective of the virtual camera (512). Thereafter, the content provider system may generate (e.g., render) images of the virtual environment 400, where each image is based on the information received from the mobile device 104, including the mobile device's current orientation, location, camera lens used, etc. For example, the mobile device 104 may move forward 2 feet in a physical environment and also change the f-stop of its camera. Such information may be communicated to the content provider system. In response, the content provider system may move the virtual camera 402 within the virtual environment 400 2 virtual feet forward. The content provider system may also simulate the f-stop of the lens of the camera of the mobile device 104 by altering a rendered image through application of lens distortion, bokeh effects, etc. The generated two-dimensional (2-D) images may also include renderings of the virtual objects in the 3D virtual environment.

The rendered image may include a different color palette than a color palette used by the mobile device 104. Therefore, a determination can be made as to whether the color palette is different (514), and if so, the rendered image can be re-colored using the color palette of the mobile device (516). Additionally, lens information may also be received for the mobile device 104, and a determination may be made whether a lens distortion function should be applied to the rendered image such that it matches the lens distortion of an image from the physical camera (518). If needed, a lens distortion function, such as a barrel distortion function, a pincushion distortion function, a fisheye distortion function, etc., may be applied to the rendered image (520). In some embodiments, recoloring the image (516) and distorting the image (520) may be part of the render operation itself (512).

In some embodiments, the content provider system may automatically determine portions of the rendered image that should be removed or obscured when the mobile device 104 composites the rendered image with an image captured from the camera of the mobile device 104 (522). The content provider system may make such a determination using any suitable criteria. In some embodiments, the content provider system may make such a determination based on settings information for the mobile device and the virtual depth of the objects in the 3D environment. For example, the content provider system may determine, based on user defined criteria, that any virtual objects having a virtual depth of 3 feet or more should not be included in the composited image. As such, the content provider system may identify portions of the rendered image that includes those virtual objects having a virtual depth of 3 feet or more. As another example, the content provider system may employ a trained image classifier to identify objects in the rendered image. The trained image classifier may have been trained by being provided with <image, name> pairs and employing a machine learning technique. Thereafter, an operator may indicate that all portions of the rendered image including a particular element, such as a mountain, be identified. Alternatively, an initial scene can be identified prior to the beginning of the augmented reality experience and used as a reference scene during the augmented reality experience. A current scene state can be compared to the reference scene state, and any new computer-generated objects can be identified as foreground objects, while any existing objects can be identified as background objects in each image. Thus, the content provider system may provide the trained image classifier with the name of the element to be removed. Based on its training, the trained image classifier may identify and indicate to the content provider system the portion of the rendered image that include the particular element.

Thereafter, the content provider system may tag the identified portion based on the determinations described above. The tag may indicate that the associated portion should be removed and/or not composited by the mobile device 104. As another example, the content provider system may add a certain color to those portions of the image that should be removed and/or not composited by the mobile device. For example, the content provider system may make all portions of the 2D rendered image that are to be removed have a green color. When the mobile device is compositing the rendered image with the image captured from its camera, the mobile device may remove all portions of the rendered image having a green color by using a chroma key technique.

In some embodiments, the tagged portion of the rendered image may include models of physical objects in the physical environment 400 that appear in front of the computer-generated object 408 from the perspective of the virtual camera 402. In these cases, the rendered image may include tagged portions of the image that obscure the view of the computer-generated object 408, creating a cutout in the rendered image. For example, if the robot in FIG. 4 walked behind the couch, the couch would obscure the view of the lower portion of the robot. After the image was rendered, the couch may be identified as a keyed or transparent area of the rendered image. When the rendered image is combined with the background image captured by the camera of the mobile device 104, the cutout created by the couch object will allow the couch in the captured image to be visible and appear to be in front of the robot.

In some embodiments, the content provider system may generate an alpha image (also referred to as an alpha channel image) from the rendered image. The alpha image may include values that indicate a level of transparency for different portions of the rendered image. Such information can be used by the mobile device to determine which portions of the rendered image are not to be composited with the image captured from the camera of the mobile device. The information may also be used to specify and/or enable compositing of the shadows to be present in the composited image. Specifically, the content provider system may determine portions of the rendered image that are in shadow of a virtual object to be included in the composted image. As such, the mobile device may specify that portions of the alpha image corresponding to the shadows have values that indicate semi-transparency. The transparency values (and thus the amount or level of transparency) may be determined based on lighting information for the rendered image, texture characteristics and geometry information for the element casting the shadow, and/or lighting information received from the mobile device 104.

The method may further include transmitting the image to the mobile device 104 (524). Various embodiments use different methods of compressing the rendered image and transmitting the rendered image, along with an alpha channel, to the mobile device 104. In one embodiment, the alpha image and the rendered image may be sent separately to the mobile device. Thus, the rendered images comprising a video may be sent over a first stream to the mobile device. The alpha images of the video may be sent to the mobile device over a second, different stream. The streams may be sent using any suitable network protocol, such as UDP or TCP.

In another embodiment, the alpha image and the rendered image may be sent to the mobile device in the same frame/buffer and/or same data stream. In one embodiment, the alpha image and the rendered image may be stitched together into a frame/buffer that has either twice the height or twice the width. Illustratively, the alpha image may have a resolution of 600×400. The rendered image may also have a resolution of 600×400. A frame may furthermore be required to have a resolution of 600×800. The alpha image and rendered image may be inserted into the frame such that the alpha image occupies a first portion of the frame and the rendered image occupies a second portion of the frame. In another embodiment, the alpha image and the rendered image may each be compressed vertically. The alpha image and the rendered image may then be combined into a single frame such that the compressed version of the alpha image comprises a first portion of the frame. The compressed version of the rendered image may comprise a second portion of the frame. Illustratively, the alpha image may have a resolution of 600×400. The rendered image may also have a resolution of 600×400. A frame may furthermore be required to have a resolution of 600×400. In the embodiment, the content provider system may compress (using an interpolation or similar technique) the alpha image to a resolution of 300×400. Likewise, the content provider system may compress the rendered image to a resolution of 300×400. The content provider system may then generate a frame to be sent to the mobile device. The upper portion of the frame may include the compressed alpha image. The bottom portion of the frame may include the compressed rendered image. The resulting frame may thus have a resolution of 600×400. As another example, the alpha image may have a resolution of 2000×2000. The rendered image may also have a resolution of 2000×2000. A frame may furthermore be required to have a resolution of 2000×2000. In the embodiment, the content provider system may compress the alpha image to a resolution of 2000×1000. Likewise, the content provider system may compress the rendered image to a resolution of 2000×1000. The content provider system may then generate a frame to be sent to the mobile device. The left portion of the frame may include the compressed alpha image. The right side of the frame may include the compressed rendered image. Thus, the resulting frame may have a resolution of 2000×2000. In this way, the bandwidth needed to composite the rendered image with the image captured by the camera of the mobile device can be reduced.

These novel compression techniques may be necessary because existing image compression techniques assumed that an image was already been composited. Therefore, the existing compression techniques do not provide support for four-channel (three color channels and one alpha channel) images to be compressed and transmitted efficiently. Because the rendering operation is being completed on one computer system (i.e., the content provider system) and the compositing is being performed on another computer system (i.e., the mobile device 104), un-composited images with an alpha channel may need to be transmitted from one computer system to the other. Compressing the alpha image with the three-channel RGB image as described above reduces the bandwidth needed to transmit these images in real time in half.

Figure 6:
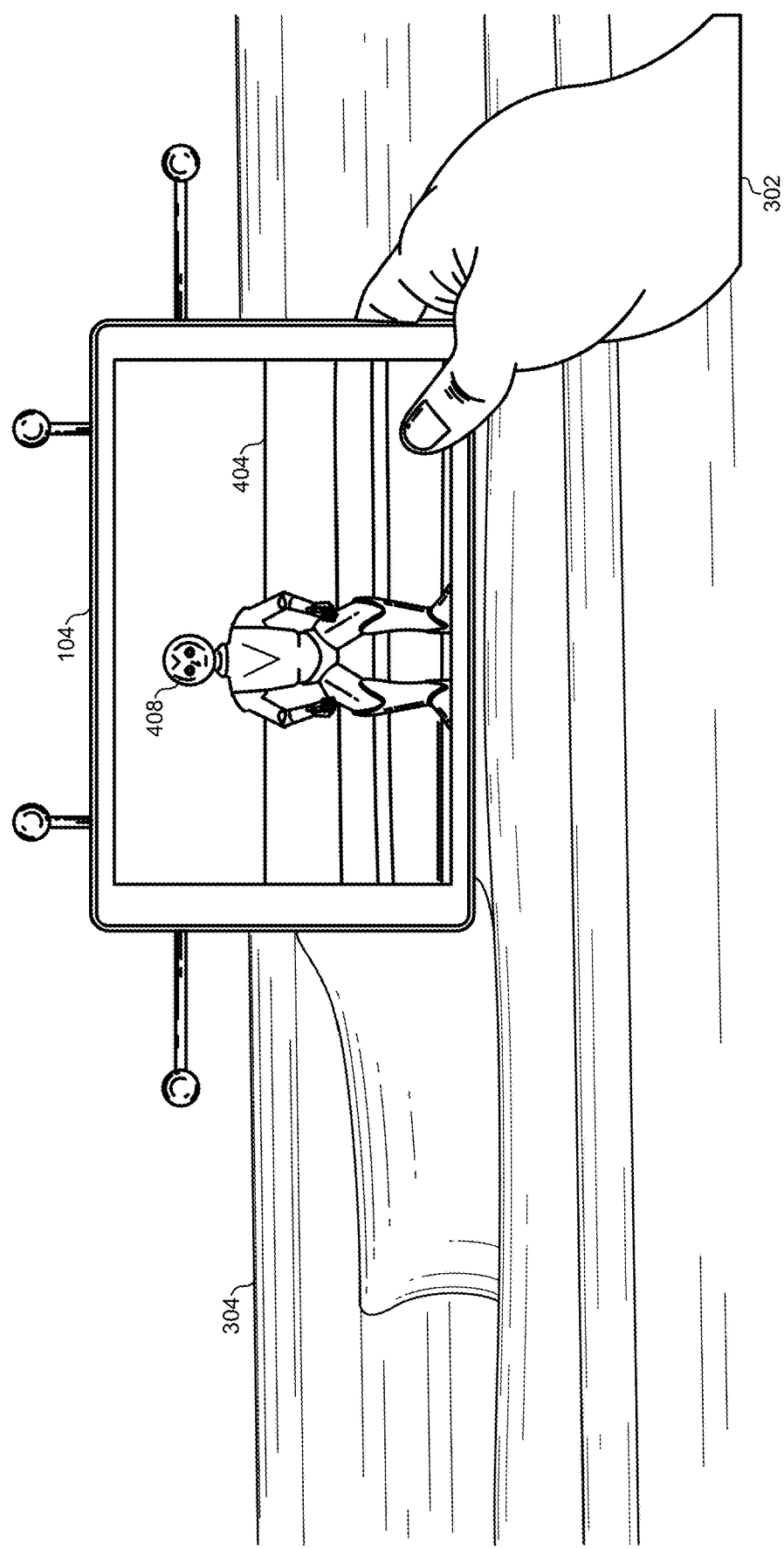
FIG. 6 illustrates a composited image on the mobile device and as it is displayed in real-time to the user, according to some embodiments.

FIG. 6 illustrates a composited image on the mobile device 104 and as it is displayed in real-time to the user 302, according to some embodiments. The mobile device 104 may receive data (e.g., rendered images, alpha images, compositing rules, synchronization information, etc.) from the content provider system in order to composite an image rendered by the content provider system with an image captured from a camera of the mobile device.

It should be noted that in many computer systems, the hardware capabilities may require the bifurcated rendering and compositing process described herein. Providing a full render of a lifelike digital asset in a full virtual environment requires processing power and memory storage that are simply not available on available mobile devices at the time of this disclosure. For example, a single digital asset (such as the generic robot character depicted in the figures), including the model, constraints, textures, and so forth, will generally require many times more memory to store and process than is even available on the most powerful tablet computer. In some cases, as much as 256 GB of RAM may be used on the content provider system to store and render such digital assets, which is more than 10-100 times the amount available on even the most powerful mobile computing devices. Furthermore, the example content provider system in FIG. 1 requires as much as 1100 W of power to perform a real-time render of the virtual environment. Not only are these power requirements impossible for a mobile-device battery to supply, the heat generated by this much processing power would destroy the motherboard of any known mobile device. Therefore, the embodiments described herein model the 3-D virtual environment and perform the rendering operations on a much higher-powered content provider system, then transmit the rendered image to the mobile device.

In contrast, the compositing operation can be done fairly efficiently on the mobile device 104. Therefore, the embodiments described herein may transmit the rendered image to the mobile device 104 to be composited with a captured image from the camera of the mobile device 104. Therefore, instead of transmitting the camera image to the content provider system and a composited image back to the mobile device 104, the embodiments described herein may only require one rendered image to be transmitted from the content provider system to the mobile device 104. The compositing operation can be performed either in software on the mobile device 104 using known techniques, or may be sent to the OpenGL interface of the graphics module of the mobile device 104 for compositing. By compositing the images on the mobile device 104, the bandwidth required is otherwise cut in half.

As illustrated in FIG. 6, the mobile device 104 displays an image of the physical object 304 (i.e., the couch) on its display. In the physical environment 300, the physical object 304 is unoccupied—no one is sitting on the couch. However, in the virtual environment 400 described above, a computer-generated object 408 was added to the virtual environment 400. The image with the computer-generated object 408 was rendered by the content provider system and areas through which the background of the physical environment should be visible were marked. The mobile device 104 receives the rendered image and composites the rendered image with the image captured by the camera of the mobile device 104. Thus, although the physical object 304 appears unoccupied in the physical environment 300, the image displayed on the mobile device 104 clearly shows the model of the physical object 404 occupied by the computer-generated object 408 as the generic robot sits on the couch. Although not clearly visible in FIG. 6, it will be understood that the computer-generated object 408 would be lighted from the left side by the content provider system using the light source 306 visible in FIG. 3 before the compositing operation.

Figure 7:
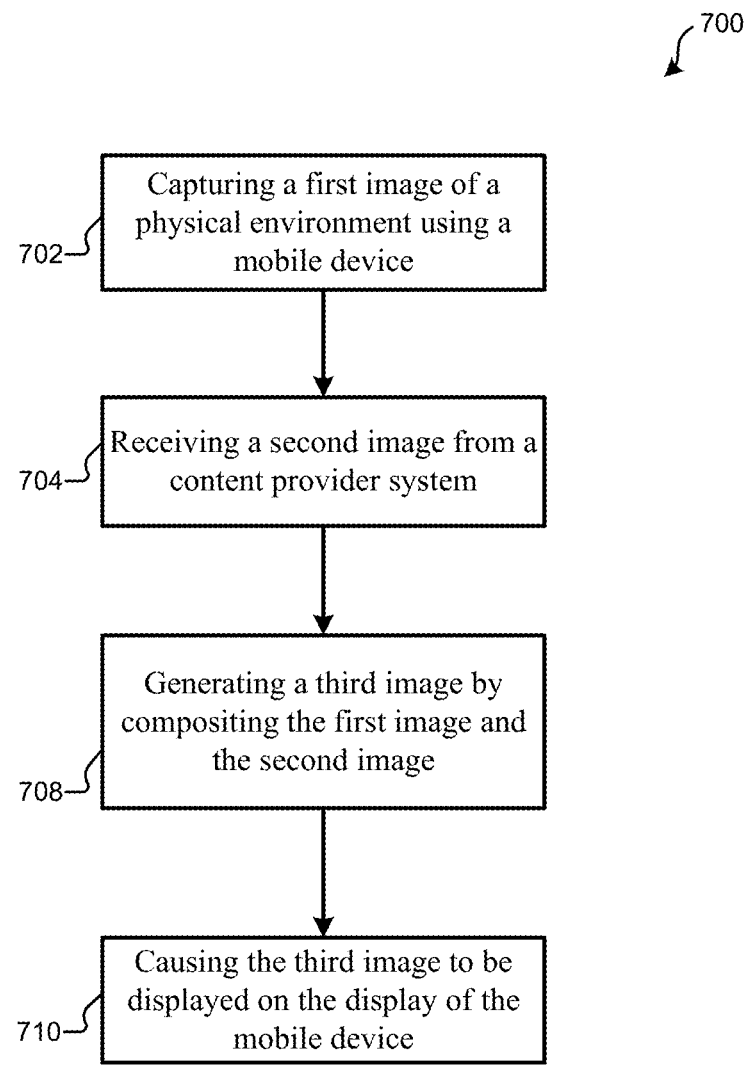
FIG. 7 illustrates a flowchart of a method for displaying a composited image on a mobile device, according to some embodiments.

FIG. 7 illustrates a flowchart 700 of a method for displaying a composited image on a mobile device 104, according to some embodiments. The method may include capturing a first image of a physical environment using a mobile device (702). The mobile device may include a physical camera and a display as described above. The method may also include receiving a second image from the content provider system (704). As described above, the second image may be generated by the content provider system by rendering of view from a virtual camera in a virtual environment. The virtual environment may represent at least a portion of the physical environment. A location of the virtual camera in the virtual environment may correspond to a location of the physical camera in the physical environment.

The method may also include generating a third image by compositing the first image and the second (708). In some embodiments, the mobile device 104 may receive a rendered image that includes portions having been tagged with a certain color, such as the color green. The color may have been added to/embedded into the rendered image by the content provider system after the rendered image had been rendered (e.g., generated based on 3-D data of the virtual environment 400). The color may indicate those portions of the image that should not be used in compositing a final image to be presented to a user of the mobile device 104.

In some embodiments, the mobile device may identify an image captured from its camera in its buffer that corresponds to the received rendered image. Such a correspondence may be determined based on a timestamp or a unique identifier associated with both the captured image and rendered image. The correspondence may alternatively be determined based on features (e.g., objects) that appear in both or correspond with one another in the captured image and the rendered image. For example, the mobile device 104 may determine that two images correspond to one another because both images include mountains of similar size and location. In other words, the first image captured by the mobile device can be synchronized with the second image rendered and provided by the content provider system such that the rendered image from the content provider system represents the same moment in time as the captured image from the mobile device 104. In some cases, the rendered image from the content provider system may arrive at the mobile device before the corresponding image from the camera of the mobile device is ready to display. Therefore, a delay can be inserted in the stream of images coming from the content provider system such that they are synchronized with the images being provided on the camera of the mobile device 104. Some embodiments may perform the opposite function, inserting a delay in the stream of images from the camera to be synchronized with the later-arriving images from the content provider system.

Upon determining a corresponding first image from the camera, in certain embodiments, the mobile device 104 may perform a chroma key process in order to create a composited (third) image that does not include the portions of the rendered image embedded with the predefined color. In one specific embodiment, the mobile device overlays the received rendered image over a corresponding image captured from its camera in order to composite or combine the images. The mobile device may automatically remove (or not include in the compositing process), any portion of the rendered image that includes a certain predefined color. For example, the mobile device may have received input indicating that the mobile device should not include any portion of a rendered image that includes a green color in the compositing process. Thereafter, the mobile device may capture an image of a physical environment that includes a cat on a street. The mobile device may also receive a corresponding rendered image from the content provider system that includes a character with a couch in the background, where the couch has a green color. When compositing (i.e., combining) the two images together, the mobile device may remove the couch from the rendered image since the couch has a green color. Thereafter, the mobile device may overlay the rendered second image over the captured first image. Since the couch was removed, the final composited image may include the couch from the first image and the character from the second image.

In another embodiment, the mobile device may receive a rendered image and an alpha image from the content system provider. In some embodiments, the rendered image and the alpha image may be received in separate synchronous data streams. The images may have the same or substantially the same resolutions. In another embodiment, the mobile device may receive the rendered image and the alpha image in the same frame/buffer and same data stream. The images may be "stretched," "squeezed," or otherwise suitably compressed as described above. In one aspect the alpha image may indicate the translucence values for different portions or parts of the rendered image. For example, a translucence value of 1 may indicate that the rendered image should have no translucence properties. A translucence value of 0 may indicate that the rendered image should be completely translucent (i.e., invisible). In one embodiment, the alpha image may only include black and white colors.

The mobile device may use the alpha image to composite the rendered image with a corresponding captured image. In particular, the mobile device may overlay the rendered image over a corresponding captured image. The alpha image would then be referenced to determine which portions of the rendered image should be translucent (and as such not included in a final composited image) and which portions should not be translucent (and as such should be included in the final composited image). In some embodiments, the alpha image may indicate portions that are to be partially translucent. Such partial transparency information may be employed in creating shadows or other effects.

For embodiments, where the rendered image and the alpha image are obtained in the same frame/buffer, the mobile device may automatically extract each of the images. The mobile device may then modify the images such that the images have their original format. For example, an alpha image may be stretched from 400×200 to 400×400. Such an extraction may be performed using any suitable interpolation technique.

Upon generating the composited image, the mobile device may present the composited image to a user via a display of the mobile device. In some embodiments, the mobile device may present a plurality of composited images at a certain frame rate. In such embodiments, the generation of a rendered image and/or the compositing of the third image may be performed within a certain amount of time (e.g., an amount of time that permits presentation of composited images to a user at interactive frame rates or in real-time).

The method may further include causing the third image to be displayed on the display of the mobile device (710). In one embodiment, the mobile device may present the composited image over a display of the mobile device. For example, the mobile device may present the composited image over an LCD screen of the mobile device. In this way, a user can view an image that is composited of elements rendered by the content provider system and elements from the physical environment captured using the camera of the mobile device. In some embodiments, the composited image may be altered in order to compensate for the most recent positioning of the mobile device using an pan-and-scan technique described below.

Although the previous discussion has been presented in terms of single images being captured, rendered, transmitted, and composited, it will be understood that these embodiments are not so limited. Instead, each of the images described above may be part of a continuous stream of images. Specifically, the first image is captured by the camera of the mobile device 104 may be captured and presented in a continuous stream of images as part of a video sequence. Similarly, the second image rendered and transmitted by the content provider system may be rendered and transmitted as a continuous stream of images as part of a second video sequence. As the first/second images are received and composited by the mobile device 104, the composited third images may be displayed in real time on the display of the mobile device as part of a third video sequence of images.

Figure 8:
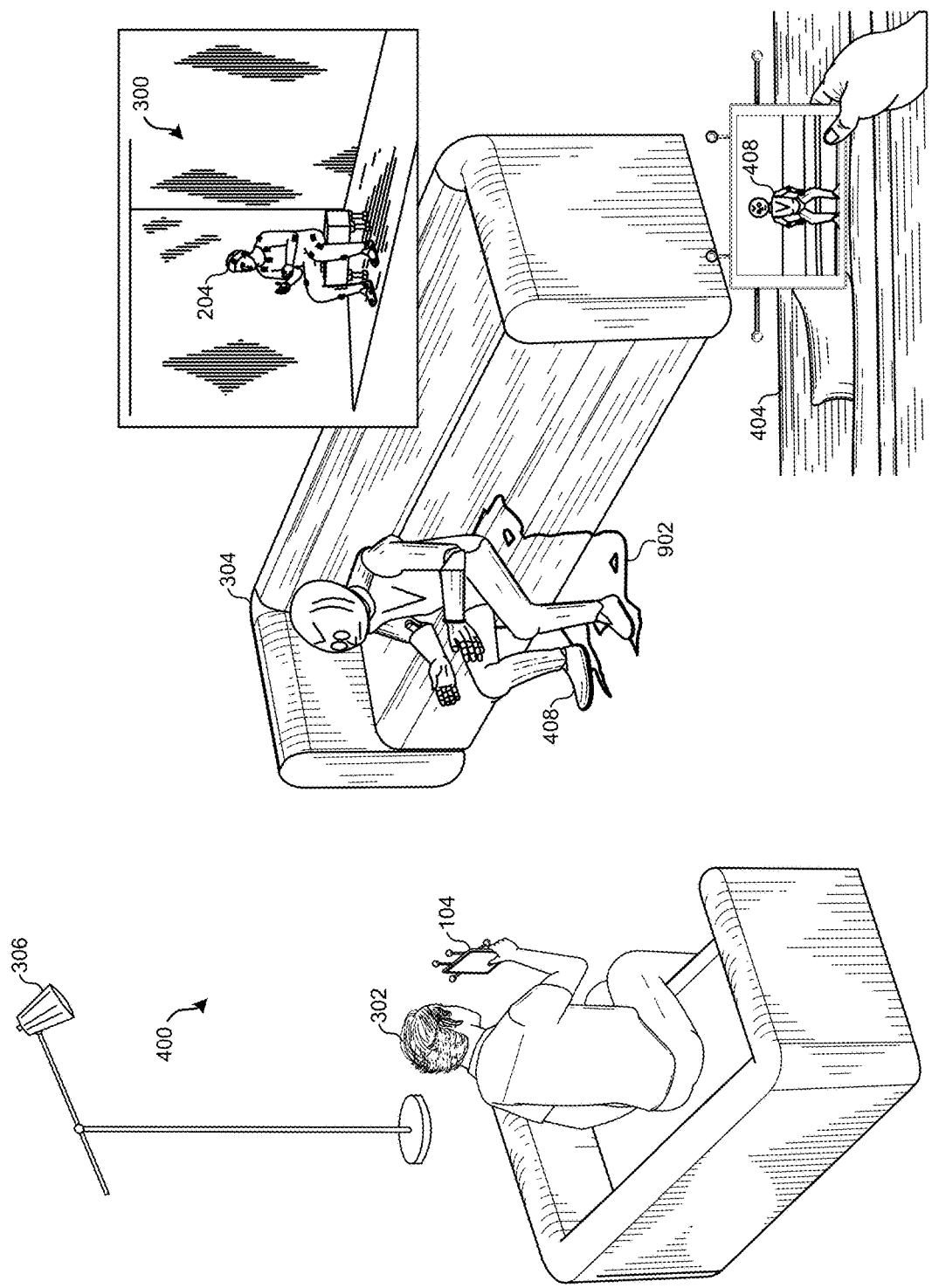
FIG. 8 illustrates a comprehensive view of how the various images in the augmented reality system can be captured, rendered, transmitted, and composited for a single frame according to some embodiments.

FIG. 8 illustrates a comprehensive view of how the various images in the augmented reality system can be captured, rendered, transmitted, and composited for a single frame according to some embodiments. FIG. 8 depicts the physical environment 300, the motion capture environment 200, and a view of the composited virtual image on the mobile device 104. In this example, the computer-generated object 408 (the generic robot) is visible in the physical environment for illustrative purposes only. It will be understood that the computer-generated object 408 would only be visible through the mobile device 104. Note that the position of the motion capture actor 204 corresponds to the position of the computer-generated object 408. Specifically, the motion capture actor 204 is sitting, and this drives the sitting position of the corresponding CGI character of the computer-generated object 408.

Figure 9:
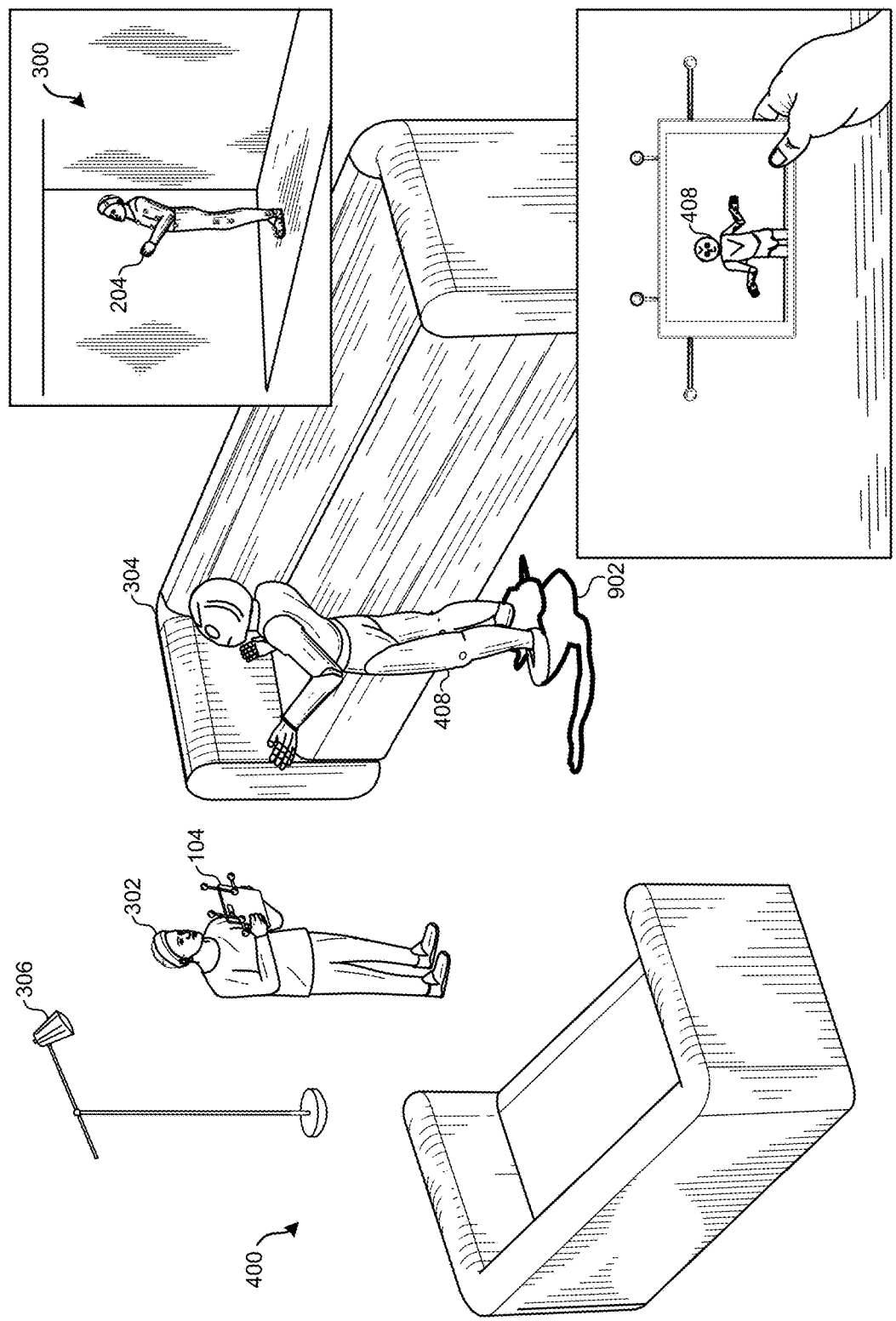
FIG. 9 illustrates a second comprehensive view of the various images in the augmented reality system in a subsequent frame, according to some embodiments.

FIG. 9 illustrates a second comprehensive view of the various images in the augmented reality system in a subsequent frame, according to some embodiments. Again, the computer-generated object 408 (C-3 PO) is visible in the physical environment for illustrative purposes only to show what is seen through the mobile device 104. Note that the position of the motion capture actor 204 has changed, and the corresponding position of the computer-generated object 408 has changed also to match the position of the motion capture actor 204. Also note that the shadows 902 projected on the physical object 304 by the computer-generated object 408 are shown as a seamless part of the composited third image. This is only possible because the model of the physical object 404 for the couch was also present in the virtual environment 400. Finally, it should be noted that the position of the user 304 has changed, along with the position of the mobile device 104. As described above, this would generate a corresponding change in the position of the virtual camera in the virtual environment 400.

In some embodiments, relatively small motions by the mobile device 104 in the physical environment 300 need not generate a corresponding change in the position of the virtual camera 402 in the virtual environment 400. Instead, the rendered image generated and transmitted by the content provider system can remain constant. Instead of generating new images, the mobile device can pan/scan an image that is larger than what is displayed on the display of the mobile device 104. Specifically, the rendered and composited images can be 10% to 25% larger than the display size of the mobile device 104. When the mobile device is moved or panned a relatively small amount, the mobile device 104 can respond by shifting the display to encompass a different portion of the composited image. Effectively, the display of the mobile device 104 will pan and/or scan around the image as the mobile device 104 is moved small increments without requiring new images to be transmitted from the content provider system. For example, when the mobile device 104 is rotated less than a predetermined threshold amount, such as 5 degrees or moved less than 1 inch, the larger composited image can instead be panned/scanned by the display rather than re-rendered and re-transmitted.

Figure 10A:
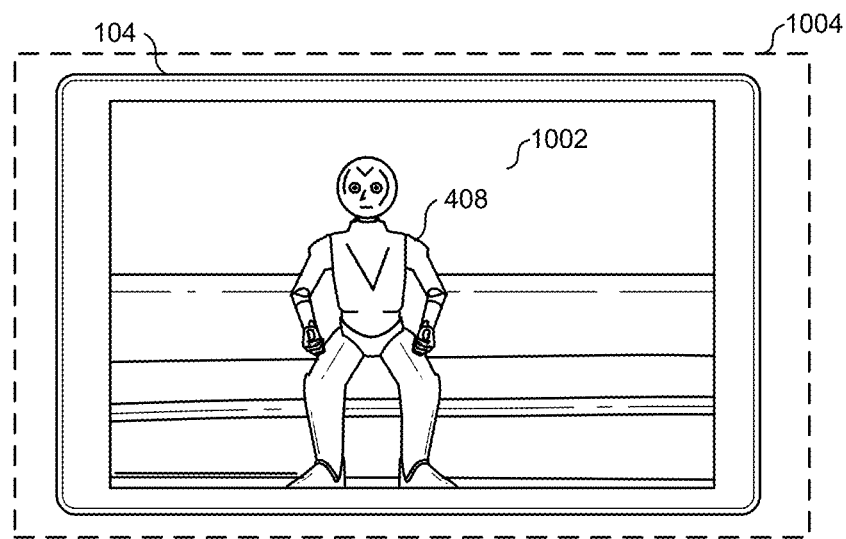
FIG. 10A illustrates a first view of a composited image on the display of the mobile device.
Figure 10B:
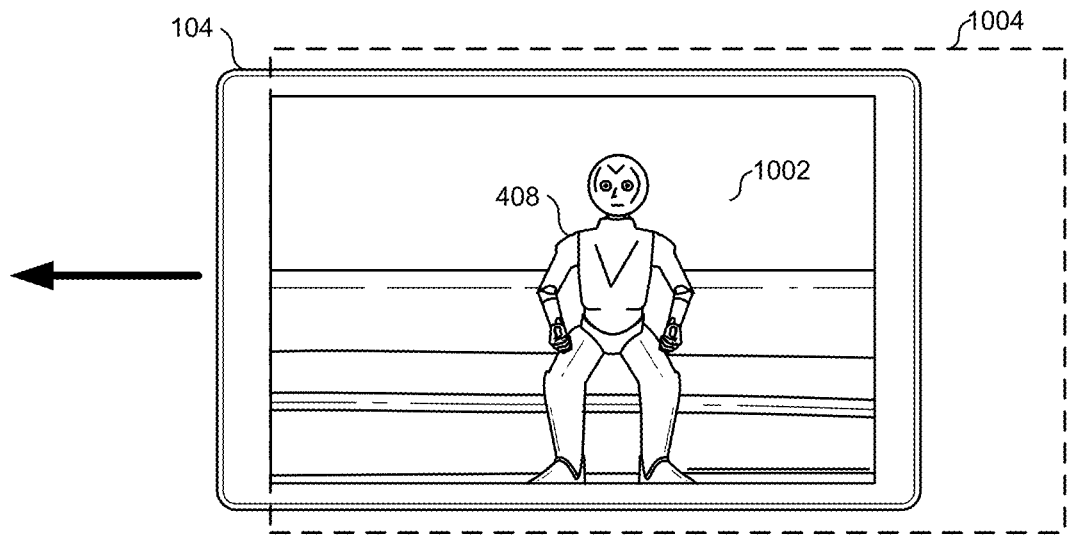
FIG. 10B illustrates a second view of the composited image on the display device.

FIG. 10A illustrates a first view of a composited image 1002 on the display of the mobile device 104. Boundary 1004 indicates the size of the composited image 1002, such that only the middle portion of the composited image 1002 is displayed on the mobile device 104. FIG. 10B illustrates a second view of the composited image 1002 on the display device. However, in this figure, the mobile device 104 has been moved to the left. It may be assumed that the elements of the physical environment 300 and the computer-generated object 408 remain stationary between FIG. 10A and FIG. 10B. Instead of requiring a new composited image in response to the movement of the mobile device to the left, the display of the mobile device 104 can pan to the left of the composited image, displaying a left portion of the composited image rather than the center portion. If the display ever pans to the boundary of the composited image, the mobile device 104 can then request new rendered images from the content provider system and/or composited new images in the video stream as needed. In situations where the mobile device 104 is rotated, the composited image 1002 can be panned and an affine transform can be applied to the composited image 1002 to simulate the effect of the rotated camera lens.

Figure 11:
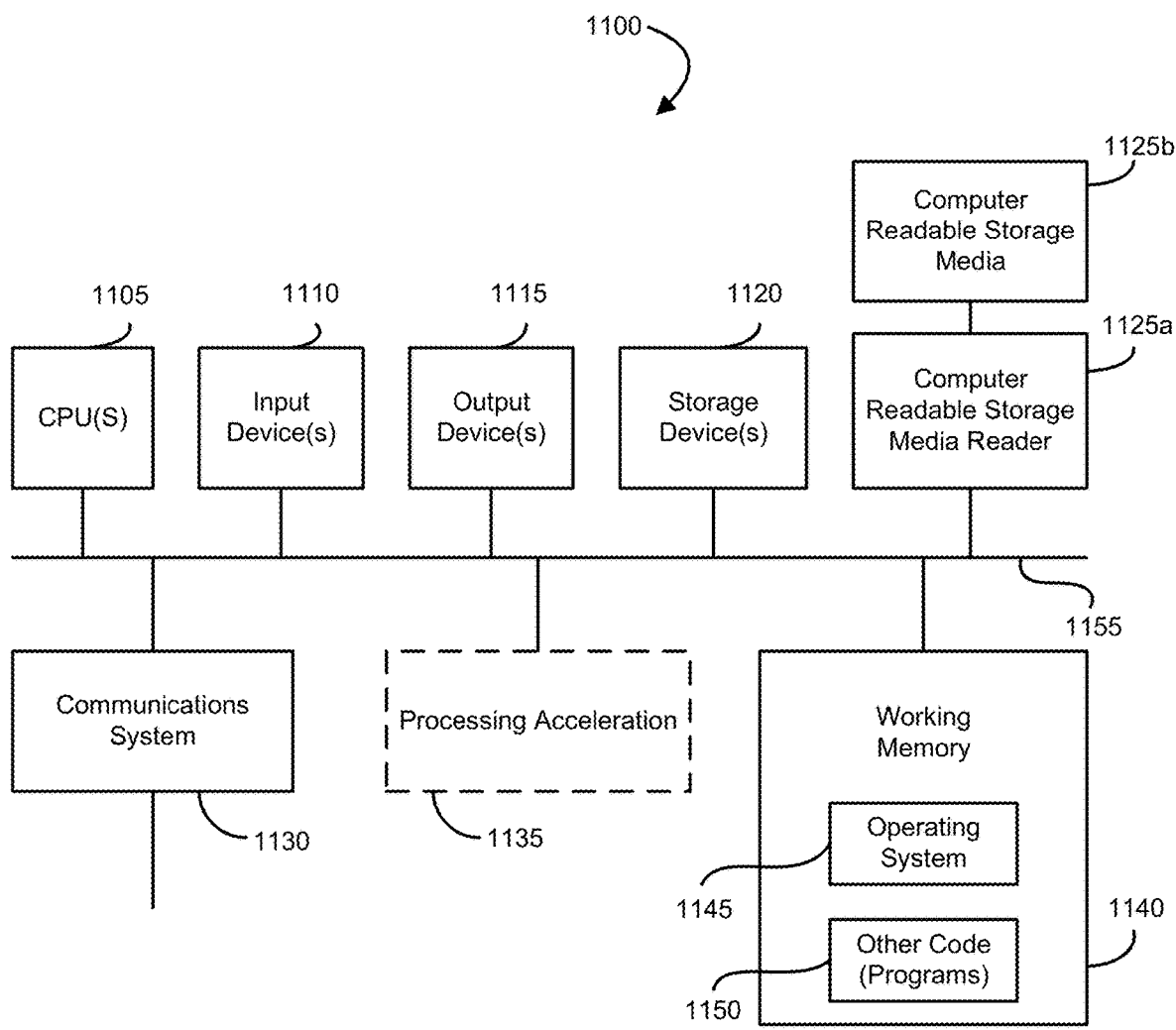
FIG. 11 illustrates an exemplary computer system, in which parts of various embodiments of the present invention may be implemented.

Each of the embodiments disclosed herein may be implemented in a special-purpose computer system. FIG. 11 illustrates an exemplary computer system 1100, in which parts of various embodiments of the present invention may be implemented. The system 1100 may be used to implement any of the computer systems described above. The computer system 1100 is shown comprising hardware elements that may be electrically coupled via a bus 1155. The hardware elements may include one or more central processing units (CPUs) 1105, one or more input devices 1110 (e.g., a mouse, a keyboard, etc.), and one or more output devices 1115 (e.g., a display device, a printer, etc.). The computer system 1100 may also include one or more storage device 1120. By way of example, storage device(s) 1120 may be disk drives, optical storage devices, solid-state storage device such as a random access memory ("RAM") and/or a read-only memory ("ROM"), which can be programmable, flash-updateable and/or the like.

The computer system 1100 may additionally include a computer-readable storage media reader 1125a, a communications system 1130 (e.g., a modem, a network card (wireless or wired), an infra-red communication device, etc.), and working memory 1140, which may include RAM and ROM devices as described above. In some embodiments, the computer system 1100 may also include a processing acceleration unit 1135, which can include a DSP, a special-purpose processor and/or the like.

The computer-readable storage media reader 1125a can further be connected to a computer-readable storage medium 1125b, together (and, optionally, in combination with storage device(s) 1120) comprehensively representing remote, local, fixed, and/or removable storage devices plus storage media for temporarily and/or more permanently containing computer-readable information. The communications system 1130 may permit data to be exchanged with the network 1120 and/or any other computer described above with respect to the system 1100.

The computer system 1100 may also comprise software elements, shown as being currently located within a working memory 1140, including an operating system 1145 and/or other code 1150, such as an application program (which may be a client application, web browser, mid-tier application, RDBMS, etc.). It should be appreciated that alternate embodiments of a computer system 1100 may have numerous variations from that described above. For example, customized hardware might also be used and/or particular elements might be implemented in hardware, software (including portable software, such as applets), or both. Further, connection to other computing devices such as network input/output devices may be employed. Software of computer system 1100 may include code 1150 for implementing embodiments of the present invention as described herein.

Each of the methods described herein may be implemented by a computer system, such as computer system 1100 in FIG. 11. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computed without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of explanation, numerous specific details have been set forth in order to provide a thorough understanding of various embodiments of the present invention. It will be apparent, however, to one skilled in the art that embodiments of the present invention may be practiced without some of these specific details. In other instances, well-known structures and devices may have been shown in block diagram form.

This description has provided exemplary embodiments only, and is not intended to limit the scope, applicability, or configuration of the disclosure. Rather, this description of the exemplary embodiments provides those skilled in the art with an enabling description for implementing an exemplary embodiment. It should be understood that various changes may be made in the function and arrangement of elements without departing from the spirit and scope of the invention as set forth in the appended claims.

Specific details have been given in the description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "non-transitory, computer-readable medium" includes, but is not limited to, portable or fixed storage devices, optical storage devices, and various other mediums capable of storing instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

What is claimed is:

1. A method comprising:
  capturing a first image of a physical environment using a mobile device, wherein the mobile device comprises a physical camera and a display;
  receiving a second image from a content provider system, wherein:
    the second image is generated by the content provider system by rendering a view from a virtual camera in a virtual environment, wherein the virtual environment represents at least a portion of the physical environment, and a location of the virtual camera in the virtual environment corresponds to a location of the physical camera in the physical environment; and
    the second image comprises a view of a computer-generated object comprising a virtual character, wherein:
      the virtual character is moved according to a live motion-capture performance;
      a time that the second image is generated in the virtual environment corresponds to a time when the first image is captured in the physical environment, such that when a third image is generated by compositing the first image and the second image, the first image and the second image are synchronized in time;

the second image comprises a four-channel image with an alpha channel that indicates portions of the second image that should be at least semi-transparent such that corresponding portions of the first image are at least partially visible as background through the second image; and the portions of the second image that should be at least semi-transparent include a shadow of the computer-generated object;

generating the third image by compositing the first image and the second image; and causing the third image to be displayed on the display of the mobile device.

2. The method of claim 1, wherein the computer-generated object is not present in the first image.

3. The method of claim 1, wherein the portions of the second image that should be at least semi-transparent include a mist or fog effect.

4. The method of claim 1, wherein the second image comprises a cutout that at least partially obscures the view of the computer-generated object, wherein the cutout corresponds to an object in the physical environment.

5. The method of claim 1, wherein the live motion-capture performance comprises:
 a motion-capture environment comprising at least one physical item that corresponds to a physical item in the physical environment; and
 a live motion-capture performer performing in the motion-capture environment.

6. The method of claim 1, further comprising removing a chroma-key background from the second image to composite the first image and the second image.

7. A mobile device comprising:
 a display;
 a physical camera;
 one or more processors; and
 one or more memory devices comprising instructions that, when executed by the one or more processors, cause the one or more processors to perform operations comprising:
  causing the physical camera to capture a first image of a physical environment;
  receiving a second image from a content provider system, wherein:
   the second image is generated by the content provider system by rendering a view from a virtual camera in a virtual environment, wherein the virtual environment represents at least a portion of the physical environment, and a location of the virtual camera in the virtual environment corresponds to a location of the physical camera in the physical environment; and
   the second image comprises a view of a computer-generated object comprising a virtual character, wherein:
    the virtual character is moved according to a live motion-capture performance;
    a time that the second image is generated in the virtual environment corresponds to a time when the first image is captured in the physical environment, such that when a third image is generated by compositing the first image and the second image, the first image and the second image are synchronized in time;
    the second image comprises a four-channel image with an alpha channel that indicates portions of the second image that should be at least semi-transparent such that corresponding portions of the first image are at least partially visible as background through the second image; and
    the portions of the second image that should be at least semi-transparent include a shadow of the computer-generated object;
  generating the third image by compositing the first image and the second image; and
  causing the third image to be displayed on the display.

8. The mobile device of claim 7, further comprising a light sensor that captures lighting information about the physical environment from a perspective of the physical camera; and
 wherein the operations further comprise transmitting the lighting information to the content provider system, wherein the virtual environment is lighted based on the lighting information about the physical environment.

9. The mobile device of claim 7, wherein the operations further comprise:
 transmitting a focal length of the physical camera to the content provider system, wherein a virtual focal length of the virtual camera is adjusted to match the focal length of the physical camera.

10. The mobile device of claim 7, further comprising a physical scanner that receives physical information about the physical environment; and
 wherein the operations further comprise transmitting the physical information to the content provider system, wherein objects in the virtual environment are adjusted based on the physical information.

11. The mobile device of claim 7, further comprising visual fiducials, wherein a position of the visual fiducials is determined by a plurality of cameras, wherein the location of the physical camera in the physical environment is based on the determined position of the visible fiducials.

12. The mobile device of claim 7, further comprising an accelerometer that captures motion information for the mobile device; and
 wherein the operations further comprise transmitting the motion information to the content provider system, wherein the location of the virtual camera in the virtual environment is adjusted based on the motion information.

13. A non-transitory, computer-readable medium comprising instructions that, when executed by one or more processors, cause the one or more processors to perform operations comprising:
 capturing a first image of a physical environment using a mobile device, wherein the mobile device comprises a physical camera and a display;
 receiving a second image from a content provider system, wherein:
  the second image is generated by the content provider system by rendering a view from a virtual camera in a virtual environment, wherein the virtual environment represents at least a portion of the physical environment, and a location of the virtual camera in the virtual environment corresponds to a location of the physical camera in the physical environment; and
  the second image comprises a view of a computer-generated object comprising a virtual character, wherein:
   the virtual character is moved according to a live motion-capture performance;

a time that the second image is generated in the virtual environment corresponds to a time when the first image is captured in the physical environment, such that when a third image is generated by compositing the first image and the second image, the first image and the second image are synchronized in time;

the second image comprises a four-channel image with an alpha channel that indicates portions of the second image that should be at least semi-transparent such that corresponding portions of the first image are at least partially visible as background through the second image; and the portions of the second image that should be at least semi-transparent include a shadow of the computer-generated object;

generating the third image by compositing the first image and the second image; and causing the third image to be displayed on the display of the mobile device.

14. The non-transitory, computer-readable medium of claim 13, wherein the third image is displayed as part of a real-time video sequence on the display such that the third image is displayed within 50 ms of when the first image is captured by the physical camera.

15. The non-transitory, computer-readable medium of claim 13, wherein:

the third image is larger than a display area of the display; and the operations further comprise:

determining that a movement of the mobile device is less than a threshold amount; and causing the display to pan the third image rather than composite a new image based on the movement.

16. The non-transitory, computer-readable medium of claim 13, wherein:

the first image comprises a first color palette;

the second image comprises a second color palette; and either the first image is translated to the second color palette or the second image is translated to the first color palette before the third image is generated.

17. The non-transitory, computer-readable medium of claim 13, wherein the second image is compressed vertically when received by the mobile device such that a first half of the image comprises three-channel color information, and a second half comprises the alpha channel.

* * * * *